United States Patent [19]

Bolda et al.

[11] Patent Number: 5,378,931
[45] Date of Patent: Jan. 3, 1995

[54] LOW LEAKAGE FUSE BLOWN DETECTION CIRCUIT

[75] Inventors: Daniel Bolda, Milwaukee County; Michael R. Havey, Waukesha County; Anthony G. Gibart, Milwaukee County, all of Wis.

[73] Assignee: Allen-Bradley Company, Inc., Milwaukee, Wis.

[21] Appl. No.: 40,696

[22] Filed: Mar. 31, 1993

[51] Int. Cl.⁶ .................. H02H 3/24; H05B 41/29
[52] U.S. Cl. ..................... 307/131; 323/367; 323/365; 324/550; 361/103; 361/104; 361/88
[58] Field of Search ............... 361/104, 103, 88, 114, 361/42; 307/131, 59, 42; 337/87; 323/367, 365; 324/550; 363/56

[56] References Cited

U.S. PATENT DOCUMENTS 4,918,562  4/1990  Pulizzi et al. ................... 361/86
4,943,886  7/1990  Quazi ............................ 361/42

Primary Examiner—A. D. Pellinen
Assistant Examiner—Aditya Krishnan
Attorney, Agent, or Firm—Mark W. Pfeiffer; John J. Horn; H. F. Hamann

[57] ABSTRACT

A fuse blown detection circuit for use in conjunction with the control transistor output circuits of a programmable controller which provides low leakage after the fuse is blown. The detection circuit comprises a pair of voltage dividers and a diagnostic triggering device forming an H-bridge network connected across the terminals of the fuse and a blocking diode. When the fuse is blown the voltage levels defined by the dividers change to activate the trigger device and enable a diagnostic signal indicative of the fuse blown condition while the blocking diode prevents current flow back through the control transistor and output circuit.

14 Claims, 2 Drawing Sheets

SOURCING APPLICATION

SINKING APPLICATION

SOURCING APPLICATION

LOW LEAKAGE FUSE BLOWN DETECTION CIRCUIT

BACKGROUND OF THE INVENTION

The present invention relates to electrical diagnostic circuitry and more particularly to fuse blown detection circuits for use with programmable controllers.

Electrical devices such as programmable controllers frequently contain fuses in series with the control transistors in their output circuits. It is frequently useful for diagnostic purposes if a signal can be generated to indicate when this fuse is blown. In the past this has been accomplished through the use of a LED indicator in series with a resistor connected across the terminals of the fuse (in parallel). However, this construction is not always satisfactory because the LED and resistor allow for a certain amount of current leakage around the fuse itself. In the past this level of leakage, which might typically be several milli-amps has not posed a problem. However, with the increased sensitivity of many input modules to output devices which are hooked to programmable controllers this level of leakage is sufficient in many cases to signal the input module to turn on if the control transistor is on or is somehow shorted.

It is therefore an object of the present invention to provide a fuse blown detection circuit which does not allow any significant amount of leakage through the output circuitry of the programmable controller module it is associated with.

It is another object of the present invention to provide a low leakage detection circuit which can be readily adapted for use in both sinking and sourcing configurations.

It is a further object of the present invention to provide a low leakage fuse blown detection circuit which is straight forward in design and easy to implement.

SUMMARY OF THE INVENTION

The present invention constitutes a fuse blown detection circuit which provides low leakage through the output control transistor of a programmable controller. The detection circuit comprises an H-bridge network having first and second voltage dividers which are separately connected to the terminals of the fuse. These voltage dividers each include a pair of resistors which define first and second voltages at the nodes between them. The first and second voltage dividers are linked together at these nodes by a light emitting diode, an optocoupler or other triggering device which enables a diagnostic signal when the fuse is blown. A blocking diode prevents current flow (i.e. leakage) back through the control transistor and the voltage divider adjacent to it when the fuse is blown. When the fuse is blown the first and second voltages change to enable current flow through the optocoupler to generate the diagnostic signal.

In sourcing configurations the bridge network formed by the voltage dividers and diagnostic trigger device is connected between the fuse terminals and ground. In sinking configurations the bridge network formed by the voltage dividers and diagnostic trigger device is connected between the fuse terminals and the voltage source for the output circuitry.

DESCRIPTION OF THE PREFERRED EMBODIMENT

Figure 1:
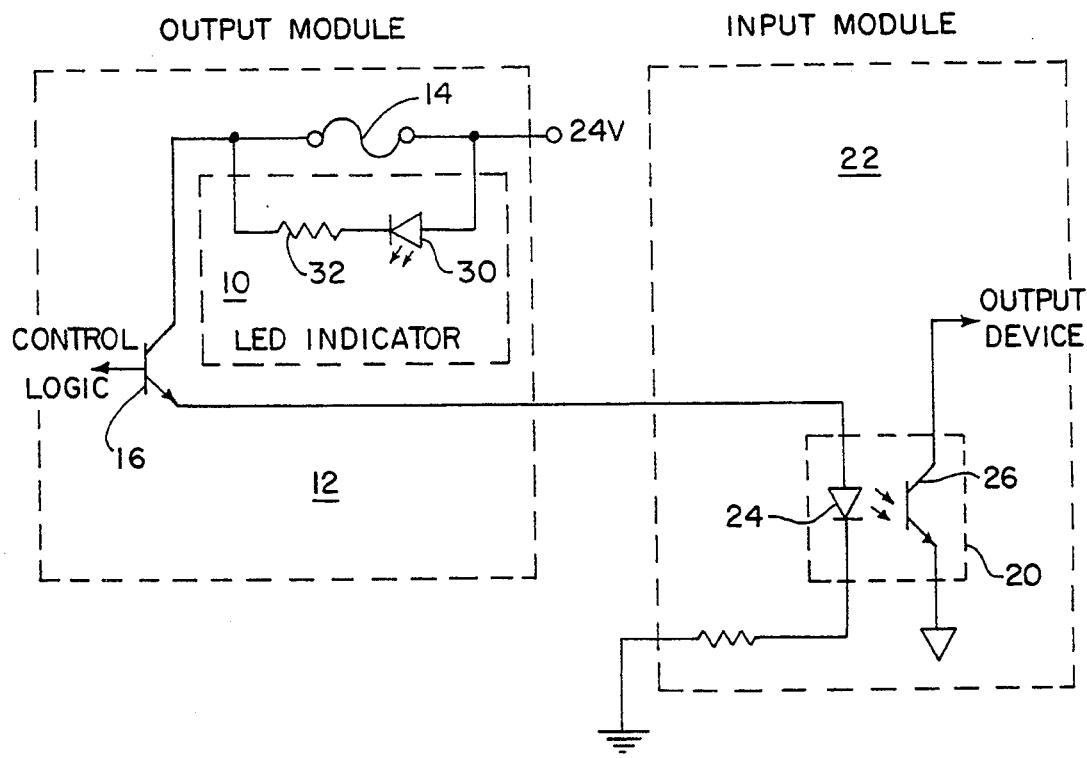
FIG. 1 provides an electrical schematic diagram of a prior art type fuse blown detection circuit showing associated output and input module circuitry.

Referring now to FIG. 1, a prior art fuse blown detection circuit 10 is shown as installed on the output module 12 of a programmable controller for indicating the status of a fuse 14 connected in series with a control transistor 16 which operates under the direction of the control logic of the microcontroller system of the programmable controller. The output of the transistor 16 is connected to an optocoupler 20 on an input module for an output device such as a motor. When the control transistor 16 turns on the light signal from the diode 24 activates the transistor 26 which in turn enables the control logic for actuating an output device. In operation, when the fuse 14 is blown a large voltage drop is enabled across the device 10 whereby the light emitting diode is activated to provide a visual signal indicative of the fuse blown condition. Unfortunately, although the resistor 32 can be made relatively large, the device 10 still can provide a significant amount of leakage through the control transistor 16 to the diode 24. Sufficiently sensitive transistors in the optocoupler 20 can be activated to provide an enabling signal to the output device despite the fact that the fuse 14 has blown thereby resulting in undesirable and potentially unsafe conditions.

Figure 2:
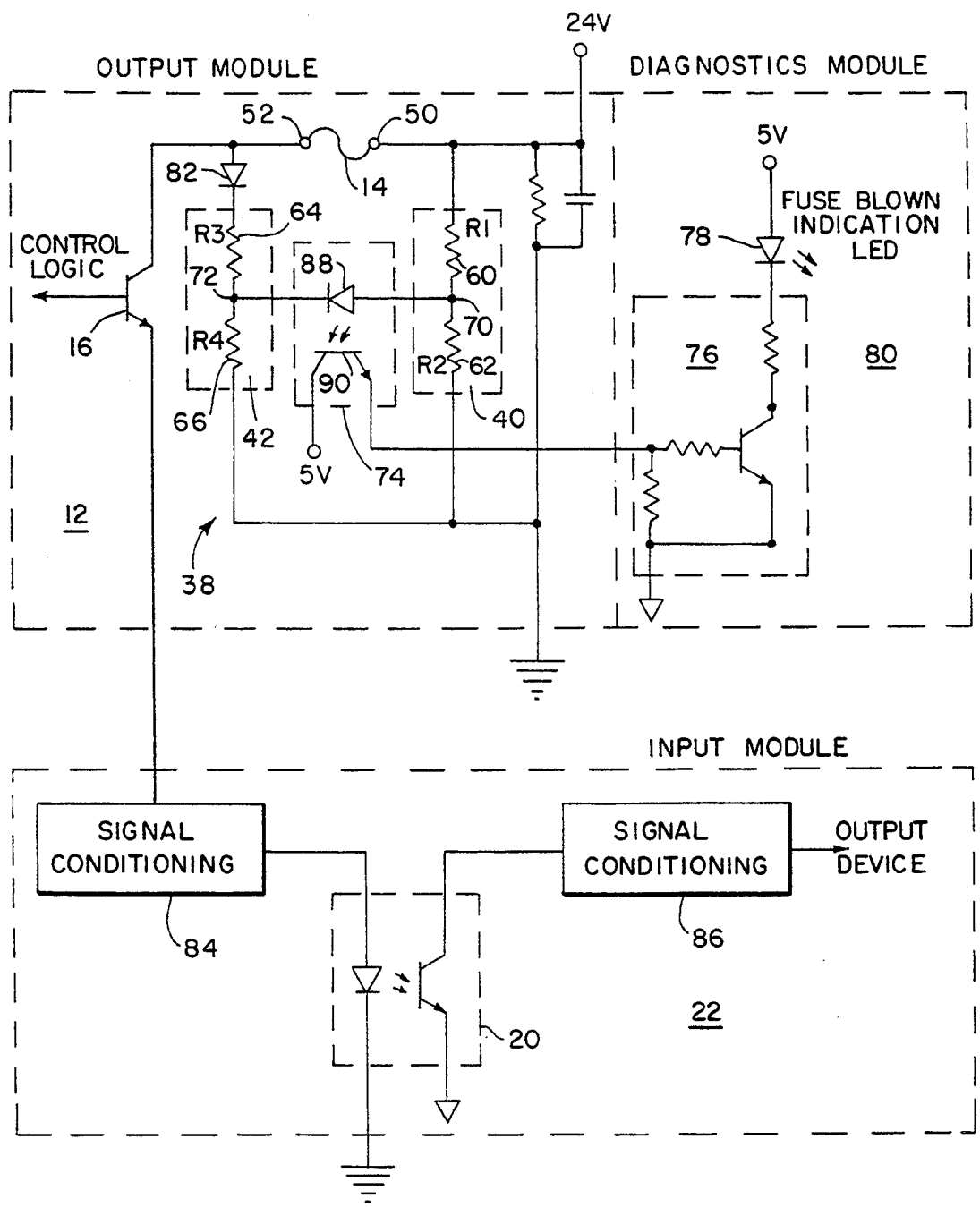
FIG. 2 provides an electrical schematic diagram of the low leakage fuse blown detection circuitry of the present invention in a current sourcing application showing input and output module circuitry.

Referring now to FIG. 2, a first embodiment of the present invention includes a low leakage detection circuit in the form of an H-bridge network including a pair of voltage dividers 40 and 42. The voltage divider 40 is connected to the input terminal 50 of the fuse 14 and includes two resistors 60 and 62. The voltage divider 42 is coupled to the output terminal 52 of the fuse 14 and includes two resistors 64 and 66. The resistors 60 and 62 are interconnected at the node 70 for defining a voltage level V1 under normal (fuse not blown) conditions. The resistors 64 and 66 are interconnected at the nodes 72 for defining a voltage level V2 under normal (fuse not blown) conditions. The optocoupler 74 is connected in between the nodes 70 and 72 and provides an output signal to light emitting diode (LED) driver circuit 76 which in turn provides a signal for illuminating the LED 78 to provide a visual indication of a fuse blown condition at a diagnostics module 80. The blocking diode 82 is connected in between the voltage divider 42 and the output terminal 52 of the fuse 14 for limiting current flow back through the transistor 16 after the fuse 14 is blown. The output of the control transistor 16 is directed to the input module 22 and, more particularly, the optocoupler 20 by way of a signal conditioning circuit 84. The output of the optocoupler 20 is directed to the output device by way of a signal conditioning circuit 86.

In a typical case, the resistors 60, 62, 64 and 66 might have values such as R1=8.87K Ohms, R2=8.06K Ohms, R3=7.5K Ohms and R4=10K Ohms, respectively. These selections of resistance values for the resistors in the voltage dividers 40 and 42 insures that under normal operating conditions when the fuse 14 is not blown, the voltage V2 at the node 72 will be greater than the voltage V1 at the node 70 and a potential will be impressed across the diode 88 so that the diode 88 is reverse biased. On the other hand, when the fuse 14 is blown and an open circuit exists between the terminals 50 and 52, the blocking diode 82 prevents current flow back through the transistor 16 and the voltage V2 at the node 72 will fall below the voltage V1 at the node 70 and a potential will be impressed upon the diode 88 so that it is forward biased. Consequently, the diode 88 produces a light signal activating the transistor 90 of the optocoupler 74 for providing a signal to the LED driver 76 whereby the LED 78 is illuminated to indicate a fuse condition. Only a very limited amount of leakage is possible through the transistor 16 whereby the optocoupler 20 might be activated for actuating the output device after the fuse is blown and thereby a safe condition is maintained.

Figure 3:
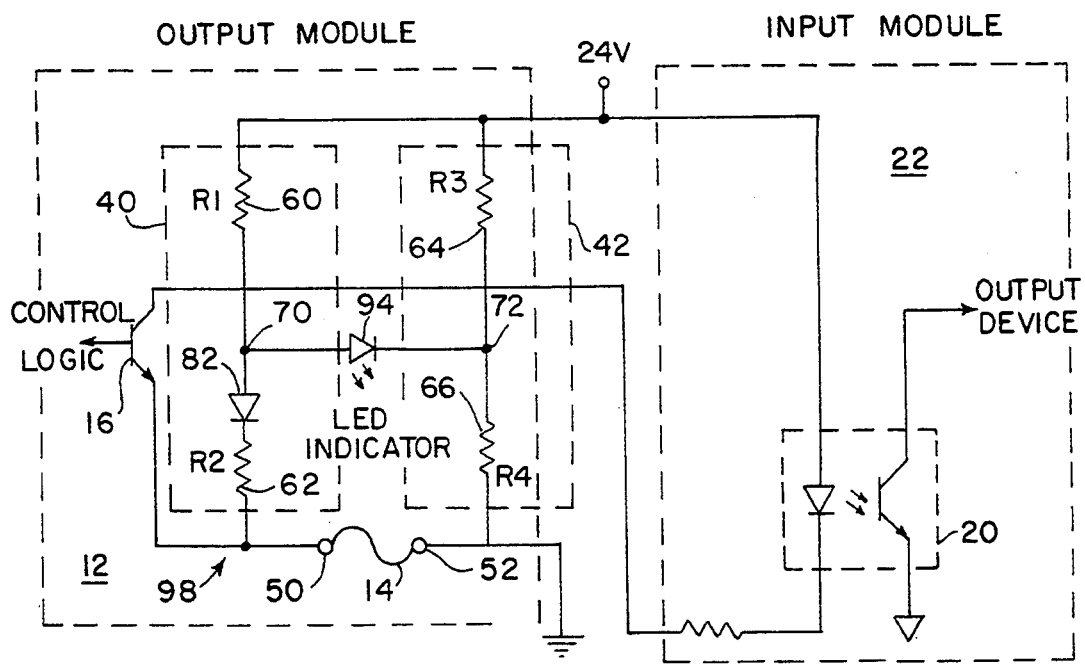
FIG. 3 provides a electrical schematic diagram of the low leakage fuse blown detection circuit of the present invention in a current sinking application showing associated input and output module circuitry.

Referring now to FIG. 3, in a second embodiment of the present invention, the fuse 14 is connected in series with the control transistor 16 at its emitter while the optocoupler 20 of the input module is connected at the collector of the transistor 16. In this configuration, the voltage divider 40 is connected to the terminal 50 adjacent to the transistor 16 while the voltage divider 42 is connected to the terminal 52 at the opposite side of the fuse 14 from the control transistor 16. A light emitting diode (LED) 94 is coupled in between the nodes 70 and 72 with its cathode connected to the node 72. In a typical case the resistors 60, 62, 64 and 66 might have values such as R1=7.5K Ohms, R2=8.06K Ohms, R3=8.06K Ohms and R4=8.87K Ohms for defining the voltages V1 and V2 at the nodes 70 and 72. The LED 94 may be mounted directly on the output module 12 to provide a visual indication of fuse status. The blocking diode 82 is connected in series with the resistor 62 between the node 70 and the terminal 50 adjacent to the control transistor 16. The H-bridge network 98 operates in a similar fashion to the network 38 shown in FIG. 2 with the voltages V1 and V2 being defined by the values of the resistors 60, 62, 64 and 66 so that under normal operating conditions no current flow takes place through the LED 94. When the fuse 14 is blown, current is enabled through the light emitting diode 94 between the nodes 70 and 72 so that a visual signal is provided to indicate a fuse blown condition. Again, the blocking diode 82 prevents current flow through the control transistor 16 which might inadvertently activate the optocoupler 20 thereby leading actuation of an output device.

While particular embodiments of the present invention have been shown and described, it should be clear that changes and modifications may be made to such embodiments without departing from the true scope and spirit of the invention. It is intended that the appended claims cover all such changes and modifications.

We claim:

1. A low leakage fuse blown detection circuit for use with a fuse having a fuse input terminal connected to a voltage supply source and a fuse output terminal opposite the fuse input terminal, comprising:

a first voltage divider including a first resistor connected to said fuse input terminal and a second resistor connected to a ground return polarity for said voltage supply for defining a first voltage at a first node at the voltage divider connection between said first and second resistors;

a second voltage divider including a third resistor connected to said fuse output terminal and a fourth resistor connected to said voltage supply ground return for defining a second voltage at a second node at the voltage divider connection between said third and fourth resistors;

means connected between said first and second nodes for responding to changes in the voltage difference between said first and second voltages to indicate when said fuse is blown; and a blocking diode connected in series with said third resistor for blocking current flow from said second node in said second voltage divider back through to the fuse output terminal when said fuse is blown.

2. The detection circuit of claim 1, wherein said means for responding to changes in said voltage difference comprises an optocoupler coupled to a diagnostic module for illuminating a visual indicator when said fuse is blown.

3. The detection circuit of claim 1, wherein said means for responding to said changes in said voltage difference includes a light emitting diode connected between said first and second nodes, and wherein said first, second, third and fourth resistors have resistance values R1, R2, R3 and R4, respectively, and said resistance values are selected to define a voltage across said light emitting diode so that said light emitting diode is reverse biased when said fuse is not blown and a different voltage across said light emitting diode so that said light emitting diode is forward biased when said fuse is blown.

4. The detection circuit of claim 3, wherein said values R1, R2, R3 and R4 are selected so that the ratio R3/R4 is less than the ratio R1/R2.

5. The detection circuit of claim 1, wherein said means for responding to changes in said voltage difference comprises a light emitting diode.

6. A low leakage fuse blown detection circuit for use with a fuse having an input terminal and an output terminal, comprising:

an H-bridge resistive network including a first voltage divider leg connected to said input terminal and a second voltage divider leg connected to said output terminal, in which said second voltage divider leg also includes a blocking diode which blocks current flow from the H-bridge resistive network back to the fuse output terminal;

an optocoupler connected between said voltage divider legs to form a bridge connection in said H-bridge resistive network, the optocoupler being responsive to a voltage imbalance in the H-bridge resistive network resulting from a blown condition of said fuse, and the optocoupler thereby producing an output signal indicating said blown condition of sold fuse; and a diagnostic module coupled to said optocoupler for generating a diagnostic signal in response to said output signal of said optocoupler when said fuse is blown.

7. The detection circuit of claim 6, wherein said first voltage divider leg includes first and second resistors having resistance values R1 and R2, respectively, and said second voltage divider leg includes third and fourth resistors having resistance values R3 and R4, respectively, and said resistance values R1, R2, R3 and R4 are selected to define a negative voltage across said optocoupler from cathode to anode when said fuse is not blown and a positive voltage across said optocoupler from cathode to anode when said fuse is blown.

8. The detection circuit of claim 7, wherein said values R1, R2, R3 and R4 are selected so that the ratio R3/R4 is less than the ratio R1/R2.

9. An output circuit for interfacing a programmable controller to an input control module of an output device, comprising:
 a control transistor for alternately switching on and off an output current to said input control module, said switching being under control of said programmable controller;
 a fuse connected in series with said control transistor for conducting said output current to said control transistor, the fuse including a fuse source terminal connected to a voltage supply source and a fuse load terminal connected to said control transistor;
 an H-bridge fuse blown detection circuit, including:
  a) a first voltage divider connected to said fuse source terminal, for defining a first voltage at a first node;
  b) a second voltage divider connected to said fuse load terminal for defining a second voltage at a second node;
  c) means connected between said first and second nodes for responding to changes in a voltage difference between said first and second voltages to indicate when said fuse is blown; and
  d) a blocking diode included as a part of said second voltage divider between said second node and said fuse load terminal for blocking reverse current flow from said second node back to said fuse load terminal, said output transistor, and said input control module when said fuse is blown.

10. The output circuit of claim 9, wherein said means for responding to changes in said voltage difference comprises an optocoupler coupled to a diagnostic module for illuminating a visual indicator when said fuse is blown.

11. A low leakage fuse blown detection circuit for use with a fuse having a fuse input terminal connected to a ground return polarity of a voltage supply and a fuse output terminal opposite the fuse input terminal, comprising:
 a first voltage divider including a first resistor connected to said fuse output terminal and a second resistor connected to a source output of the voltage supply for defining a first voltage at a first node at the voltage divider connection between said first and second resistors;
 a second voltage divider including a third resistor connected to said fuse input terminal and a fourth resistor connected to said source output of the voltage supply for defining a second voltage at a second node at the voltage divider connection between said third and fourth resistors;
 means connected between said first and second nodes for responding to changes in a voltage difference between said first and second voltages to indicate when said fuse is blown; and
 a blocking diode connected in series with said first resistor for blocking current flow from said first node in said first voltage divider back through to the fuse output terminal when said fuse is blown.

12. The detection circuit of claim 11, wherein said means for responding to changes in said voltage difference comprises an optocoupler coupled to a diagnostic module for illuminating a visual indicator when said fuse is blown.

13. The detection circuit of claim 12, wherein said first, second, third and fourth resistors have resistance values R1, R2, R3 and R4, respectively, and said resistance values are selected to define a negative voltage across said optocoupler from cathode to anode when said fuse is not blown and a positive voltage across said optocoupler from cathode to anode when said fuse is blown.

14. The detection circuit of claim 12, wherein said means for responding to changes in said voltage difference comprises a light emitting diode.

* * * * *